United States Patent [19]
Sato et al.

[11] Patent Number: 5,955,856
[45] Date of Patent: Sep. 21, 1999

[54] NUMERICAL CONTROL APPARATUS AND METHOD

[75] Inventors: Tomonori Sato; Takashi Iwasaki; Teiji Takahashi, all of Tokyo, Japan

[73] Assignee: Mitsubishi Denki Kabushiki Kaisha, Tokyo, Japan

[21] Appl. No.: 09/080,961

[22] Filed: May 19, 1998

[30] Foreign Application Priority Data

May 20, 1997 [JP] Japan ................................. 9-130011

[51] Int. Cl.$^6$ .................................................. G05B 11/01
[52] U.S. Cl. ........................ 318/560; 318/573; 318/567; 318/568.15; 318/569; 318/568.22
[58] Field of Search .................................. 318/573, 567, 318/568.15, 569, 560, 568.22

[56] References Cited

U.S. PATENT DOCUMENTS 3,748,563  7/1973  Pomella et al. ...................... 318/573

FOREIGN PATENT DOCUMENTS 7210225  8/1995  Japan .

*Primary Examiner*—Karen Masih
*Attorney, Agent, or Firm*—Leydig, Voit & Mayer, Ltd.

[57] ABSTRACT

A numerical control apparatus and a numerical control method is provided which permit high-accuracy and high-velocity travel at a joint between paths as well as simple and rapid calculations for this purpose. A path is inserted at the joint between the paths so as to achieve a continuous curvature.

25 Claims, 17 Drawing Sheets

G91 G01X100. , JL30. JT10. , ;
X100. Y100. ;

EXPLANATION

G91 : INCREMENT INSTRUCTION
G01 : STRAIGHT LINE INTERPOLATION
X, Y : X Y COORDINATE VALUE OF END POINT
JL : CORRECTION RANGE OF JOINT CORRECTING SECTION
JT : ALLOWABLE ERROR OF JOINT CORRECTING SECTION

G91G01X100. , JL30. JT10. , ;
G03X100. Y100. I0. J100. ;

EXPLANATION

G91 : INCREMENT INSTRUCTION
G01 : STRAIGHT LINE INTERPOLATION
X, Y : X Y COORDINATE VALUE OF END POINT
JL : CORRECTION RANGE OF JOINT CORRECTING SECTION
JT : ALLOWABLE ERROR OF JOINT CORRECTING SECTION
G03 : ARCUATE INTERPOLATION (ANTICLOCKWISE)
I, J : COORDINATES OF ARC CENTER
    (RELATIVE POSITION TO STARTING POINT)

G91G02X100. Y100. I100J0. , JL30. JT10. ;
G02X30. Y-30. I30. J0. ;

EXPLANATION

G91 : INCREMENT INSTRUCTION
G01 : STRAIGHT LINE INTERPOLATION
X, Y : X Y COORDINATE VALUE OF END POINT
JL : CORRECTION RANGE OF JOINT CORRECTING SECTION
JT : ALLOWABLE ERROR OF JOINT CORRECTING SECTION
G02 : ARC INTERPOLATION (CLOCKWISE)
G03 : ARC INTERPOLATION (ANTICLOCKWISE)
I, J : CENTER COORDINATE OF ARC
        (RELATIVE POSITION FROM STARTING POINT)

G91 G01X100. ,R170. ;
X100. Y100. ;

EXPLANATION

```
G91 : INCREMENT INSTRUCTION
G01 : STRAIGHT LINE INTERPOLATION
X, Y : X Y COORDINATE VALUE OF END POINT
,R : RADIUS OF CORNER R
```

NUMERICAL CONTROL APPARATUS AND METHOD

BACKGROUND OF THE INVENTION

1. Field of the Invention

The present invention relates to a numerical control apparatus and a numerical control method applicable commonly to a controller (a motion controller, a sequencer, a robot controller, a sewing machine or the like) giving an instruction to a machine (an assembler, a measuring instrument, a conveyor, a robot, a sewing machine or the like) travelling along an instructed path, and more particularly, to a numerical control apparatus and a numerical control method of a machine tool.

2. Description of the Related Art

FIG. 25 illustrates the configuration of an ordinary numerically controlled (NC) machine. In FIG. 25, the NC machine includes a numerical control (NC) program 101, a numerical control (NC) apparatus 102, a servo amplifier 103, a motor 104, and a machine tool 105. First, a path along which the machine tool 105 is to travel is described in the NC program 101. Then, the NC apparatus 102 gives an instruction from time to time to the servo amplifier 103 so that the machine tool 105 travels along the path described in the NC program 102. The servo amplifier 103 drives the machine tool 105 by rotating the motor 104 in compliance with the given instruction.

At this point, the NC apparatus 102 is required to have only a slight deviation from a path specified by the NC program 101 (locus accuracy) and to travel in a short period of time. These two requirements have a trade-off relationship. For example, travelling along a corner portion or a small-diameter curvature portion at a high speed leads to saturation of the output torque of the motor 104, impossibility of the machine tool 105 to follow the travel, or occurrence of a mechanical vibration, thus requiring a reduction in speed. This results in a longer period of time of travel. This is similar to a case of driving a car, where it is necessary to reduce the speed before reaching a corner.

While a locus accuracy error of null is of course ideal, an allowable range of locus accuracy (allowable error) is provided in practice, and it suffices that a locus accuracy is within this range. Rather, positive correction of the paths within an allowable range would permit reduction of the travelling time while satisfying restrictions on locus accuracy. When passing through the path, in general, in order to avoid saturation of the output torque of the motor 104, the normal acceleration (acceleration in a direction transverse to the travelling direction) should be up to a certain value. The normal acceleration is proportional to a square of the travelling speed, and is proportional to the curvature (=1/radius of curvature). Therefore, in order to increase the travelling speed under a restriction requiring the normal acceleration to be up to an allowable value, it is effective to reduce the curvature (to increase the radius). The principle is the same as that of car driving in that a larger radius of road leads to a higher travelling speed. An example is a method shown in FIG. 26.

FIG. 26 illustrates a method described in the Programming Manual of Mitsubishi Numerical Control Unit "MELDAS 300 Series" (published by Mitsubishi Electric Corporation). In FIG. 2, 101 is an NC program, 102 is an NC apparatus, 201 is an NC program interpreter, 202 is an arc inserting section, 203 is an interpolation-acceleration/deceleration section, 205 is an original path, 206 is a path after correction, and 207 is an instruction to a servo amplifier. The NC apparatus 102 is composed of the program interpreter 201, the arc inserting section 202, and the interpolation-acceleration/deceleration section 203.

FIG. 27 illustrates a typical NC program for the application of the conventional method. In the NC program 101, a specific code (R) and a numerical value indicative of the arc radius are described at a position where an arc is to be inserted.

The NC program interpreter 201 interprets the NC program and generates an original path 205 (name give to discriminate from the path after correction described later). The arc inserting section 202 inserts an arc at a position corresponding to a particular code (R). Interpolation and acceleration or deceleration are performed at the interpolation-acceleration/deceleration section 203 in accordance with the path after correction 206, and an instruction 207 to the servo amplifier is prepared.

FIG. 28 illustrates the result of path correction by the above-mentioned conventional method. The path is corrected into a form having an arc inserted at a corner. While the curvature is infinite at the corner (Pj) in the original path, the curvature along the arc in this method is 1/(arc radius). In this method, therefore, it is possible to increase the travelling speed, bringing about an advantage of a shorter travelling time than in the travel on the original path.

A similar method is disclosed in Japanese Unexamined Patent Publication or Laid-Open No. H07-210,225. This is another method of inserting an arcuate block at a corner portion. This patent publication describes conditions for insertion of an arc, the manner of selecting an arc radius and the speed upon passing through the arc.

In the above-mentioned method, however, only the tangential directions (angles) are made smoothly continuous, still involving the problem of the curvature (=1/radius of curvature) not being continuous.

FIG. 29 illustrates the angle and the curvature of a path corrected by the conventional method. As is clear from FIG. 29, while the angle is continuous, the curvature is not continuous with a step formed at the boundary between the straight and arcuate portions. When such a portion showing discontinuity of curvature is passed across at a constant speed, the normal acceleration also shows discontinuity, producing a mechanical vibration as shown in FIG. 30, and resulting in deterioration of locus accuracy. This is just like an abrupt manipulation of the steering wheel when driving a car.

Or, when the speed is sufficiently reduced before reaching the boundary between the straight and arcuate portions, the normal acceleration would naturally become smaller, but this involves a problem of a longer travelling time.

The present invention is intended to obviate the above-mentioned problems and has for its object to provide a novel and improved numerical control apparatus and method which is capable of permitting travelling at a joint between paths at a high accuracy and a high speed, and at the same time allowing simple and rapid calculations for such a purpose.

SUMMARY OF THE INVENTION

According to a first aspect of the present invention, there is provided a numerical control apparatus comprising a joint correcting section for inserting a path for making the curvature or the acceleration continuous at a joint between two paths.

In a preferred form of the first aspect of the invention, the joint correcting section inserts a path which gives a locus accuracy of up to a specified allowable error.

In another preferred form of the first aspect of the invention, the joint correcting section determines a point where the angle, the curvature or the acceleration is discontinuous as being a joint.

In a still further preferred form of the first aspect of the invention, the joint correcting section does not correct a joint when a specific command previously registered is specified for the joint between the two paths.

In a yet further preferred form of the first aspect of the invention, the path inserted at the joint correcting section is a piecewise path comprising a plurality of intervals.

In a further preferred form of the first aspect of the invention, the piecewise path at the joint correcting section forms a curve having a plurality of control points on the original paths.

In a further preferred form of the first aspect of the invention, the path inserted at the joint correcting section runs inside the original path in the proximity of the joint and runs outside the original path on the periphery portion of the joint.

In a further preferred form of the first aspect of the invention, the path is corrected in response to the speed at the joint correcting section.

In a further preferred form of the first aspect of the invention, the path is corrected in response to the magnitude of vibration produced at the joint correcting section.

According to a second aspect of the present invention, there is provided a numerical control method comprising the step of inserting a path making the curvature or the acceleration continuous at a joint between two paths.

In a preferred form of the second aspect of the invention, the path has a locus accuracy of up to a specified allowable error.

In another preferred form of the second aspect of the invention, a point where the angle, the curvature or the acceleration is discontinuous is determined as being a joint.

In a further preferred form of the second aspect of the invention, when a specific command previously registered is specified for a joint between two paths, correction of the joint is not conducted.

In a further preferred form of the second aspect of the invention, the inserted path is a piecewise path comprising a plurality of intervals.

In a further preferred form of the second aspect of the invention, the piecewise path is a curve having a plurality of control points on the original paths.

In a further preferred form of the second aspect of the invention, the inserted path runs inside the original path in the proximity of the joint, and runs outside the original path on the periphery of the joint.

In a further preferred form of the second aspect of the invention, the path is corrected in response to the speed.

In a further preferred form of the second aspect of the invention, the inserted path is corrected in response to the magnitude of vibration produced.

The above and other objects, features and advantages of the present invention will be more readily apparent from the following detailed description of preferred embodiments of the invention taken in conjunction with the accompanying drawings.

DESCRIPTION OF THE PREFERRED EMBODIMENTS

Figures 1, 2:
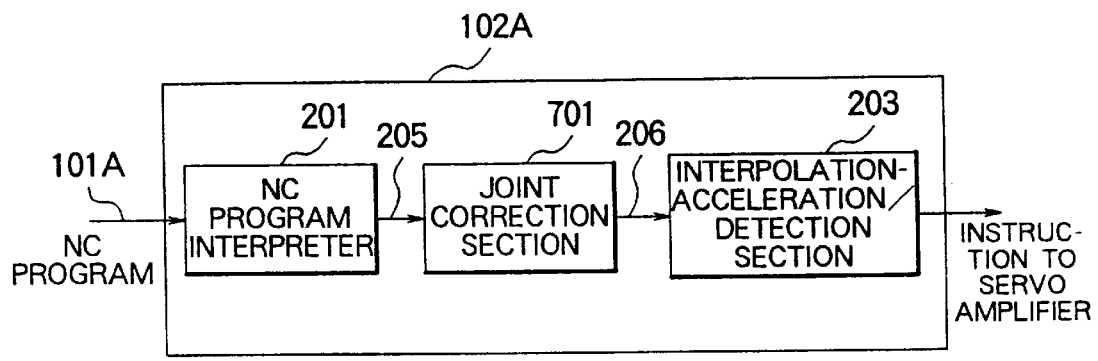
FIG. 1 is a block diagram illustrating an NC apparatus of a first embodiment of the invention.
FIG. 2 illustrates an example of the NC program in the method of the first embodiment of the invention.

Embodiments of the present invention will be described below with reference to the accompanying drawings. Components identical with, or corresponding to, those of the foregoing conventional art are assigned the same reference numerals.

(First Embodiment)

Figures 5, 6:
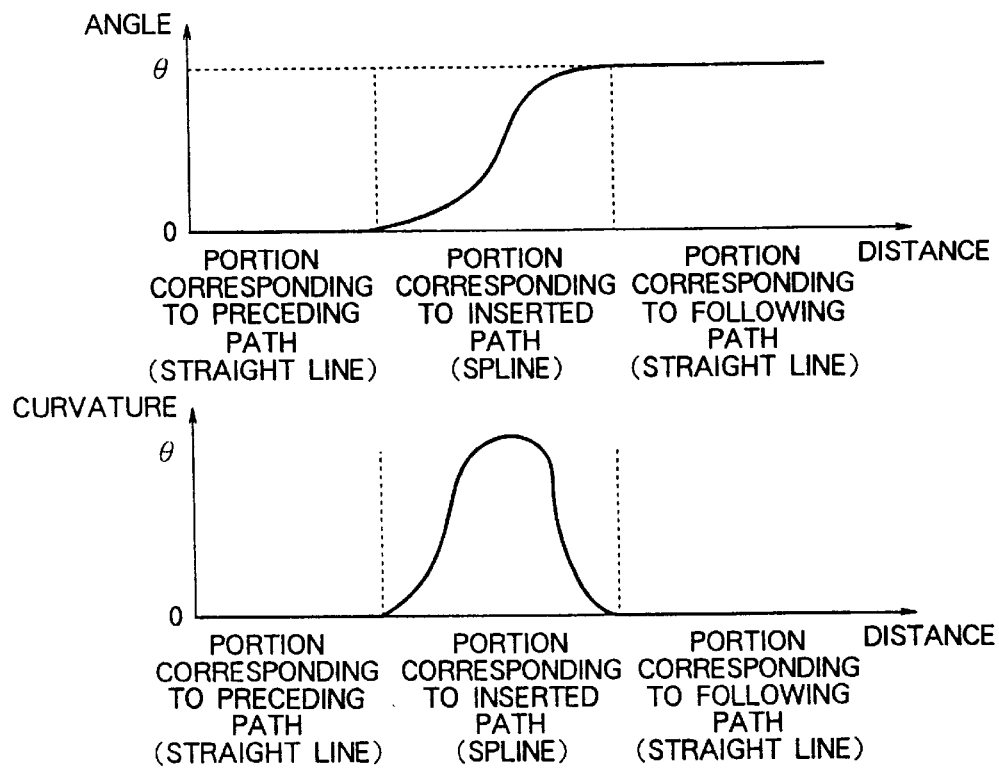
FIG. 5 illustrates the angle and the curvature of a path corrected by the method of the first embodiment of the invention.
FIG. 6 illustrates an NC program in a second embodiment of the invention.

FIG. 1 is a block diagram illustrating a numerical control (NC) apparatus in accordance with a first embodiment of the present invention. In FIG. 1, an NC apparatus of this embodiment, generally designated at a reference numeral 102A, includes a program interpreter 201, a joint correcting section 702 and an interpolation-acceleration/deceleration section 203. The NC apparatus 102A of the present invention can be applied to a numerically controlled machine tool as shown in FIG. 5. In this case, the known NC apparatus 102 is replaced with the apparatus 102A of the invention. Thus, the components of the machine tool other than the NC apparatus can be the same as those shown in FIG. 2, and hence are not described in detail here.

FIG. 2 illustrates an example of an NC program 101A employed with the present invention. In this program, for the portion of which the joint is to be corrected, a correction width is described immediately following a specific code (JL) and a numerical value representing an allowable error, immediately following another specific code (JT). In this example, the correction width is 30 and the allowable error is 10.

The joint correcting section 701 inserts into a joint portion bearing the description of specific codes on the original path 205 a spline curve which satisfies a specified correction range and an allowable error as designated and which makes the angle and the curvature of the joint portion continuous, thereby correcting the joint. The interpolation-acceleration/deceleration section 203 performs an interpolation and an acceleration or a deceleration in compliance with a path 206 after the correction to prepare an instruction 207 to a servo amplifier.

Figure 3:
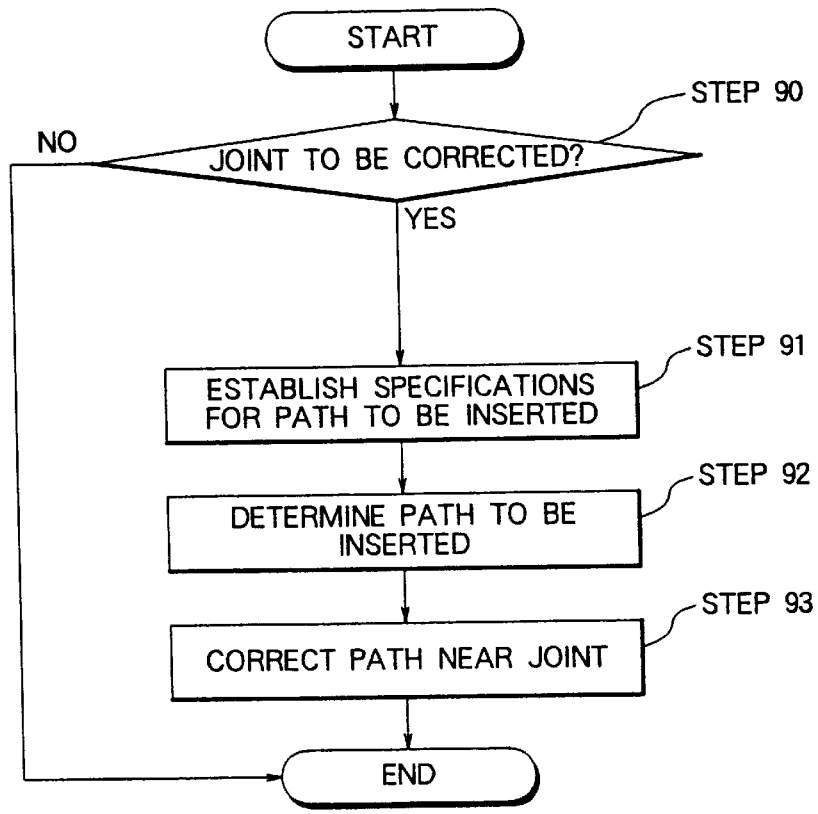
FIG. 3 is a flowchart illustrating operations of a joint correcting section.

FIG. 3 is a flowchart illustrating the operation of the joint correcting section 701. First, as shown in FIG. 3, in step 90, it is determined whether or not the joint is to be corrected. The joint bearing specific codes (JL and JT) is then subjected to step 91 for correction, whereas the other portions are left untouched.

In step 91, specifications for the path to be inserted are established. Values of the correction range and allowable error described in the NC program are used here.

In step, 92, the path to be inserted is determined. Restricting conditions to be satisfied by the subject path are as follows. First, the position, the angle and the curvature of the subject path must be continuous at the boundaries with the adjacent paths before and after the subject path. That is, in order for the position, the angle and the curvature to be continuous, it suffices that the position, the velocity and the acceleration are continuous. Further, to satisfy restrictions on the locus accuracy, the position of the path or passage to be inserted at which it becomes the most distant from the original path is simply specified (e.g., such a position is the center of the path to be inserted in most cases). Any kind of path may be applicable so far as it satisfies the conditions described above. For example, because there are seven restricting conditions here, a seven-degree spline curve is adopted as the simplest path. More particularly, when assuming that the formula representing the curve is Pt(t), (t ranges from 0 to L), then, it is expressed by:

$$P(t)=C6t^6+C5t^5+C4t^4+C3t^3+C2t^2+C1K+C0 \quad (1)$$

where t is a parameter and L is a path length, and Ci (i ranges from 0 to 6) is a coefficient of the curve. When incorporating the foregoing restricting conditions into Formula (1), it would result in:

$$P(O)=Pb \quad (2\text{-}1)$$

$$P'(O)=Vb \quad (2\text{-}2)$$

$$P''(O)=Ab \quad (2\text{-}3)$$

$$P(L)=Pf \quad (2\text{-}4)$$

$$P'(L)=Vf \quad (2\text{-}5)$$

$$P''(L)=Af \quad (2\text{-}6)$$

$$P(L/2)=Pt \quad (2\text{-}7)$$

where symbol "'" represents differentiation with t; Pb, Vb and Ab represent the position, the velocity and the acceleration, respectively, of the immediately following path; and Pf, Vf and Af represent the position, the speed and the acceleration, respectively, of the immediately preceding path. If it is assumed that the formula of curve for the following path is Pb(t), (t ranges from 1 to Lb; Lb is the length of the following path), and that for the preceding path, Pf(t), (t ranges from 0 to L1; Lf is the length of the preceding path), calculations would be possible by:

$$Pb=Pb(Lb) \quad (3\text{-}1)$$

$$Vb=Pb'(Lb) \quad (3\text{-}2)$$

$$Ab=Pb''(Lb) \quad (3\text{-}3)$$

$$Pf=Pf(O) \quad (3\text{-}4)$$

$$Vf=Pf'(O) \quad (3\text{-}5)$$

$$Af=Pf''(O) \quad (3\text{-}6)$$

Pc is the position in the center of the path, which is disposed within the range of allowable error from the joint (Pj) of the original path. For example:

$$Pc=Pj+\epsilon \cdot u \quad (3\text{-}7)$$

where $\epsilon$ is a value of up to an allowable error, and u is a unit vector in the direction of the line equally dividing the inside of the angle at Pj.

The coefficients of curve Ci are primarily determined by solving the simultaneous equations (2-1) to (2-7) described above.

Figure 4:
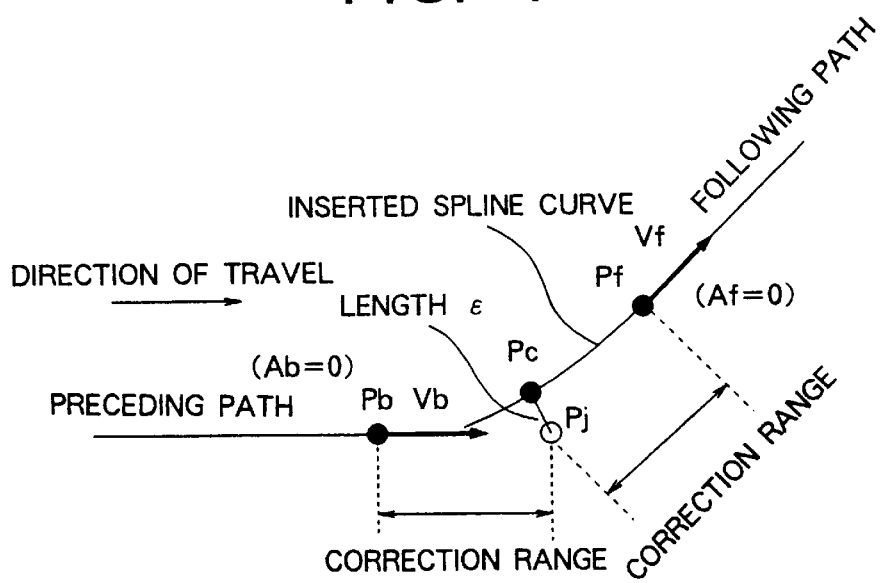
FIG. 4 illustrates a path corrected by a method of the first embodiment of the invention.

In step 93, portions of the path near the joint are corrected. Simultaneously with the insertion of the spline curve corresponding to the curve coefficient Ci determined in step 92 into the joint portion, the end point of the following path and the starting point of the preceding path are corrected into Pb and Pf, respectively, from the joint (Pj) of the original path. FIG. 4 illustrates the corrected path.

FIG. 5 illustrates the angle and the curvature of a corrected path. As is clear from FIGS. 4 and 5, not only the angle but also the curvature become smoothly continuous. When the curvature is thus continuous, travel can be accomplished without causing a mechanical vibration, and as a result, a satisfactory locus accuracy can be obtained without reducing the velocity.

While a six-degree spline curve has been employed in the foregoing case, the coefficients in this case are seven in number ranging from C0 to C6 and leading to a degree of freedom of seven. In general, in order to make the position, the velocity and the acceleration continuous at both ends, a degree of freedom of at least six is necessary. Because the degree of freedom in the foregoing case is higher by one, another restricting condition, i.e., the condition of passing at a specific point at the center portion can be added. In general, an increased degree of freedom of a path results in an increase in the number of restricting conditions which can be satisfied. For example, when using a seven-degree spline curve, it is possible to impose another restricting condition (i.e., specifying another point of passage, or specifying a tangential vector at the center). When using a curve of the lowest-limit degree of freedom of six (a five-degree spline curve, for example), on the contrary, an additional restricting condition cannot be imposed. A higher degree of the curve, permitting free arrangement of the curve, has a defect of an increased amount of calculations.

While a spline curve has been used in the foregoing case, any other curve may be used so far as it has a degree of freedom of at least six. For example, use of a B-spline curve, a Bezier curve, an NURBS curve, or a rational Bezier curve make it possible also to obtain the same effect.

The correction range and the allowable error have been specified in the NC program in the foregoing case. Default values may be previously registered to use at default.

While, in the above case, the path has corrected so as to satisfy the restriction on the allowable error, and allowable error may be omitted, or a specified value may be ignored. In this case, the locus accuracy cannot be controlled, but a smaller number of restricting conditions leads to easier calculations because of a lower degree of the curve (for example, a five-degree spline curve may be used in place of a six-degree curve).

(Second Embodiment)

In a second embodiment, a joint between a straight line and an arc will be described. At the joint between the straight line and an arc, a step is produced between different curvatures even when the angle is continuous.

As the second embodiment of the invention has the same configuration as that of the block diagram shown in FIG. 1, a description thereof is omitted here. Operations of the joint correcting section 701, being the same as those shown in the flowchart of FIG. 3, are not described here.

FIG. 6 illustrates a typical NC program of the invention. For the portion of which the joint is to be corrected, a correction range is described immediately following a specific code (JL) and a numerical value representing an allowable error, immediately following another specific code (JT). In this case, the correction range in 30, and the allowable error in 10.

Figure 7:
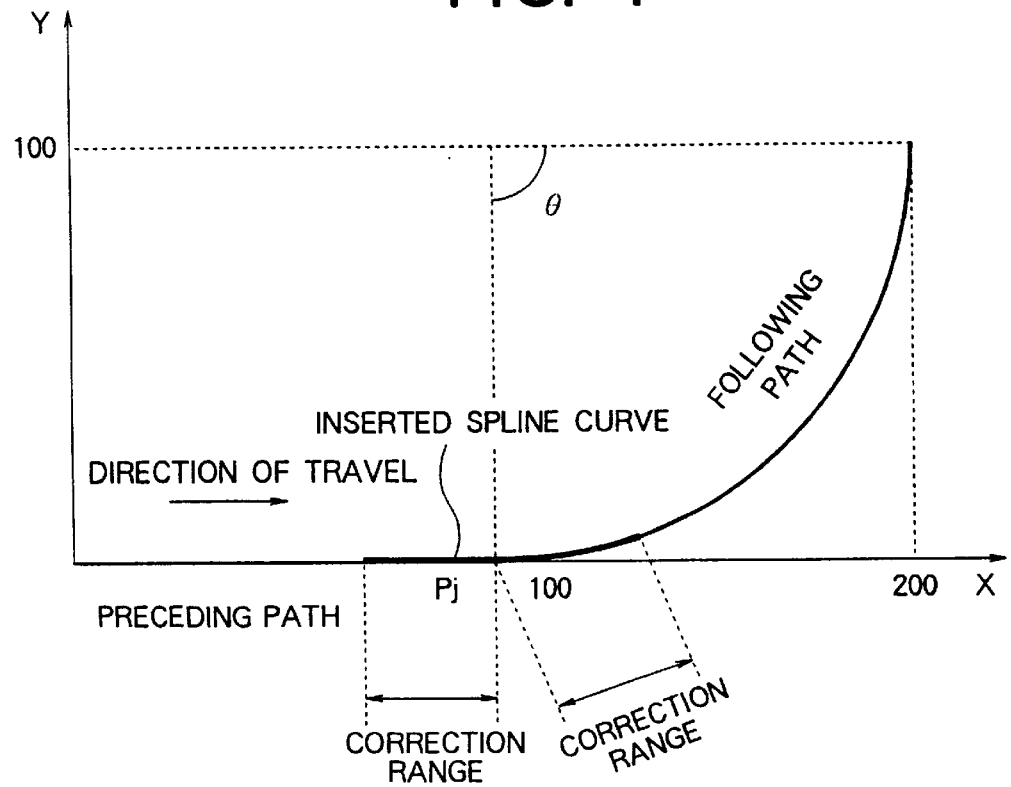
FIG. 7 illustrates a path corrected by the method of the second embodiment of the invention.

FIG. 7 illustrates the thus corrected path. A spline curve is inserted at the joint portion between the straight line and the arc.

Figure 8:
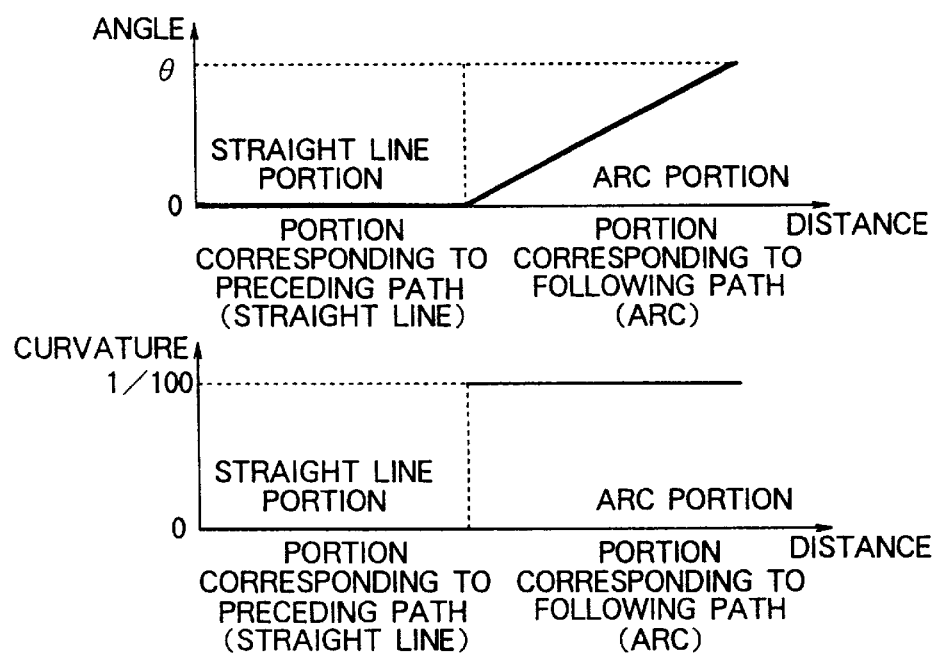
FIG. 8 illustrates the angle and the curvature of an original path in the second embodiment of the invention.
Figures 9, 10:
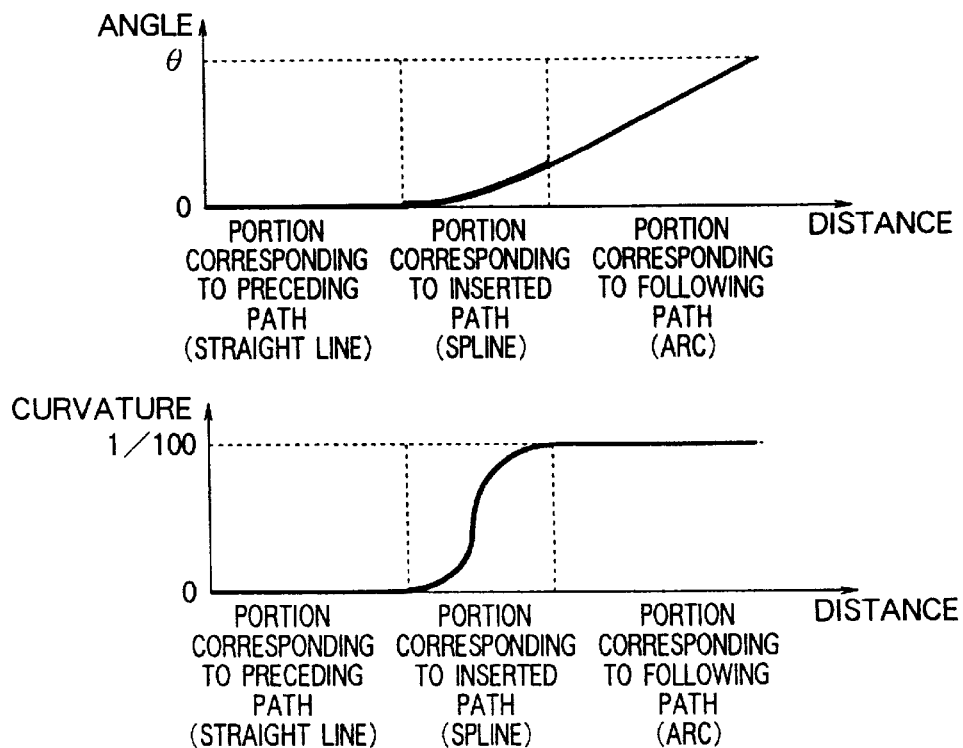
FIG. 9 illustrates the angle and the curvature of a path corrected by the method of the second embodiment of the invention.
FIG. 10 illustrates an example of NC program in a third embodiment of the invention.

FIG. 8 illustrates the angle and the curvature of the original path. As is clear from FIG. 8, the angle is continuous, but the curvature has a step at the joint, and this is a cause of the mechanical vibration. On the other hand, FIG. 9 illustrates the angle and the curvature of the corrected path. In this case, not only the angle and the curvature become smoothly continuous. Such a continuous curvature permits travel without causing a mechanical vibration and obtaining a satisfactory locus accuracy without reducing the velocity.

(Third Embodiment)

For a third embodiment, a joint between two arcs will be described. A step of curvature occurs at a joint between two arcs when these arcs have different radii, or when the two arcs rotate in different directions (clockwise and counter clockwise), even when the angle is continuous.

As the third embodiment of the invention has the same configuration as that of the block diagram shown in FIG. 1, a description thereof is omitted here. Operations of the joint correcting section 701, being the same as those shown in the flowchart of FIG. 3 are not described here.

FIG. 10 illustrates a typical NC program of the invention. For the portion of which the joint is to be corrected, a correction range is described immediately following a specific code (JL) and a numerical value representing an allowable error, immediately following another specific code (JT). In this case, the correction range is 30, and the allowable error is 10.

Figure 11:
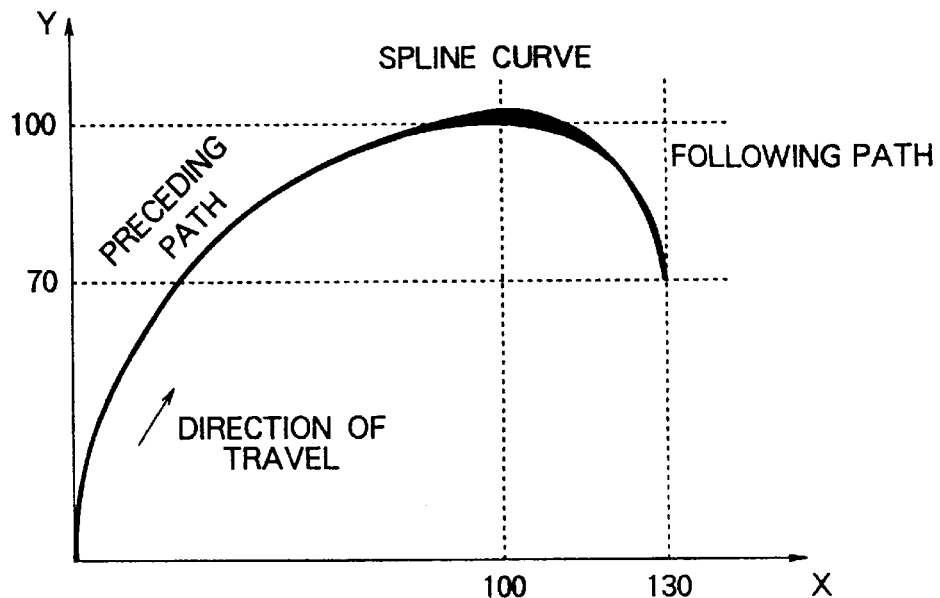
FIG. 11 illustrates a path corrected by the method of the third embodiment of the invention.

FIG. 11 illustrates the thus corrected path. A spline curve is inserted at the joint between two arcs.

Figure 12:
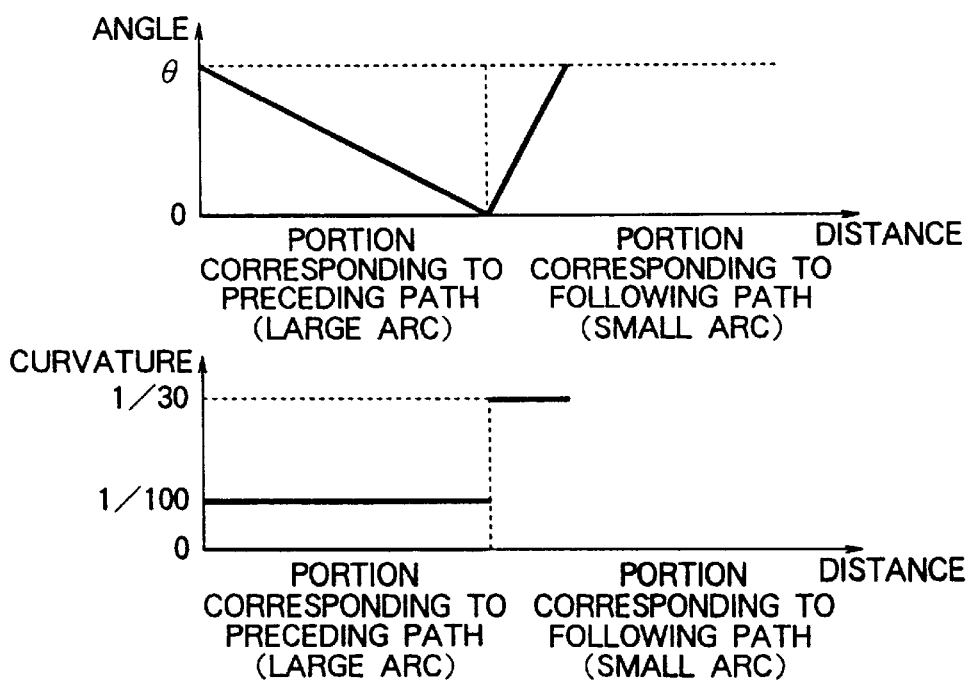
FIG. 12 illustrates the angle and the curvature of an original path in the third embodiment of the invention.
Figure 13:
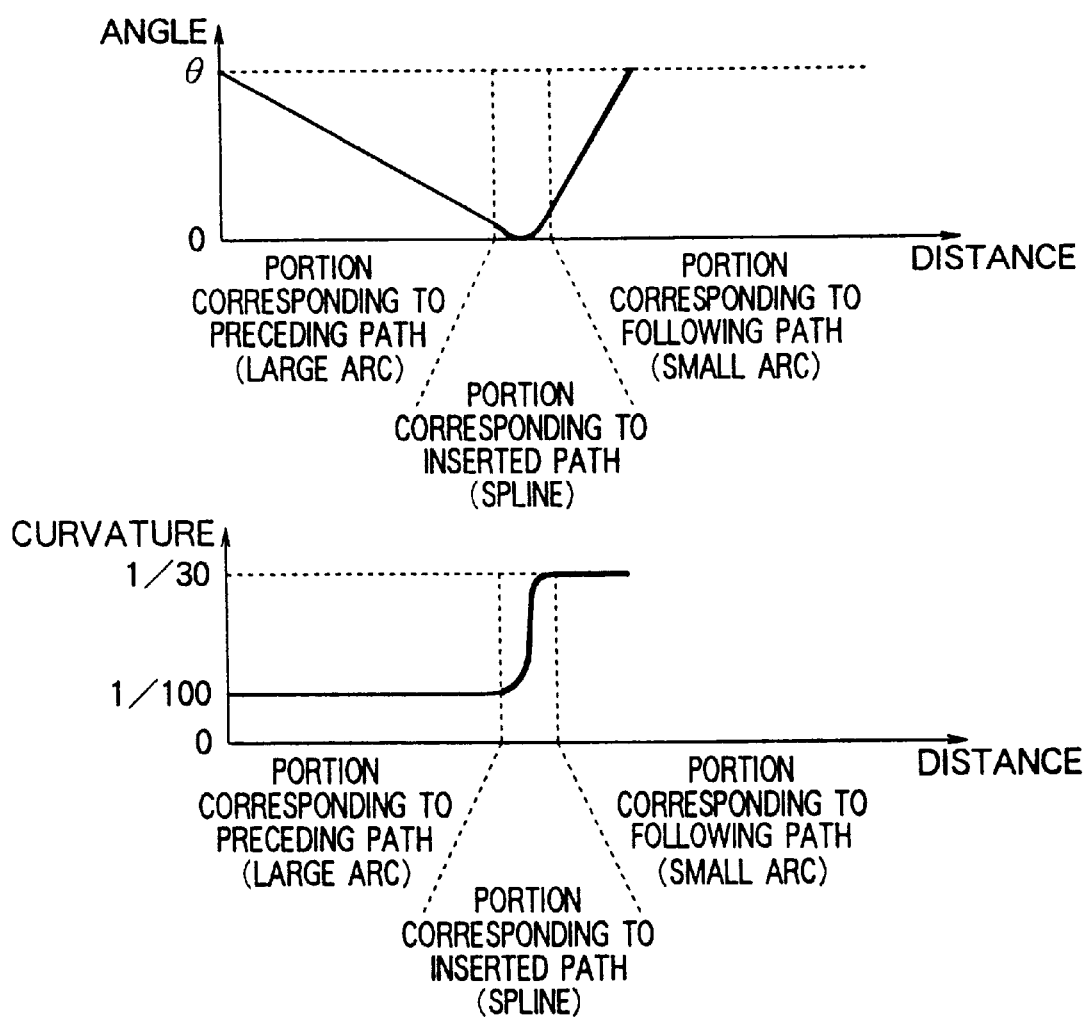
FIG. 13 illustrates the angle and the curvature of a path corrected by the method of the third embodiment of the invention.

FIG. 12 illustrates the angle and the curvature of the original path. As is clear from FIG. 12, the angle is continuous, but the curvature has a step at the joint, and this is the cause of the mechanical vibration. On the other hand, FIG. 13 illustrates the angle and the curvature of the corrected path. In this case, not only the angle and the curvature become smoothly continuous. Such a continuous curvature permits travel without causing a mechanical vibration and obtaining a satisfactory locus accuracy without reducing the velocity.

(Fourth Embodiment)

In the above-mentioned first to third embodiments, the joint to be corrected has been explicitly shown in the NC program. In a fourth embodiment, in contrast, a method of automatically selecting a joint to be corrected will be described.

As the fourth embodiment of the invention has the same configuration as that of the block diagram shown in FIG. 1, a description thereof is omitted here. Operations of the joint correcting section 701, being the same as those shown in the flowchart of FIG. 9 except for step 90, are not described here.

Figure 14:
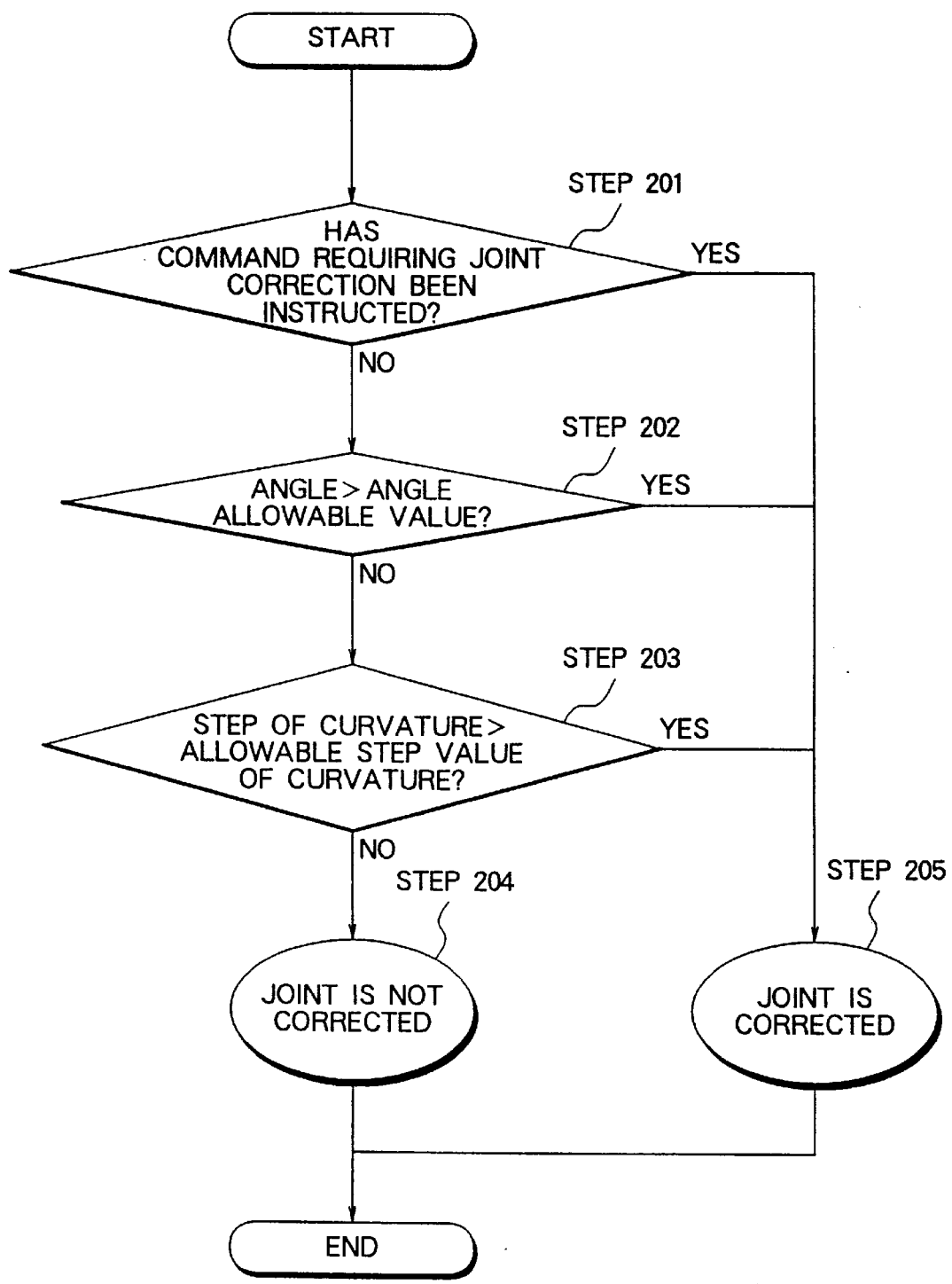
FIG. 14 is a flowchart illustrating operations of a method of a fourth embodiment of the invention.

In the fourth embodiment, the procedure shown in FIG. 14 is followed in place of step 90. In step 201, it is checked up whether or not a command meaning joint correction is explicitly inserted in the NC program. If instructed, the process goes to step 205. If not instructed, the process proceeds to step 202. In step 202, it is determined whether or not the angle is larger than a predetermined allowable angle value. If larger, the process goes to step 205, and if smaller, to step 203. In step 203, it is checked whether or not a step of curvature is larger than a predetermined allowable value of curvature step. If larger, the process proceeds to step 205, and smaller, to step 204. When step 204 is finally reached, the joint is not corrected. If step 205 is reached, the joint is corrected.

In FIG. 14, the sequence of step 201, step 202 and step 203 is arbitrary.

The step of curvature has been checked in the aforesaid step 203. In view of complexity and the large amount of curvature calculations, the magnitude of the acceleration vector may be used as an approximation of the curvature when the tangential speed can be deemed to be constant. The acceleration vector permits easy calculation because of the possibility to perform calculation by the use derived from function of the formula of the curve.

According to the fourth embodiment of the invention, a portion to be corrected is automatically selected without issuing an explicit instruction to correct a joint to the NC program. This provides an advantage of permitting omission of labor to correct the NC program.

(Fifth Embodiment)

A fifth embodiment of the invention covers a method of not conducting correction of a joint when an instruction is indicative of inappropriateness of correcting a joint between paths.

The fifth embodiment has the same configuration as that shown in the block diagram of FIG. 1. A description thereof is therefore omitted here. Operations of a joint correcting section 701, being the same as those shown in the flowchart of FIG. 3 except for step 90, are not described here.

In the fifth embodiment, a procedure shown in FIG. 3 is followed in place of step 90. In step 201, it is determined whether or not an instruction to correct the joint has been issued. If instructed, the process goes to step 206, and if not, to step 202. In step 202, it is checked whether or not the angle is larger than a predetermined allowable value of angle. If larger, the process proceeds to step 206, and if not, to step 203. In step 203, it is determined whether or not the step of the curvature is larger than a predetermined allowable value of step of the curvature. If larger, the process goes to step 206, and if smaller, to step 204. In step 206, when a previously registered command is specified, the process goes to step 204, and if not, to step 205. When step 204 is finally reached, the joint is not corrected, and when step 205 is reached, the joint is corrected.

Figure 15:
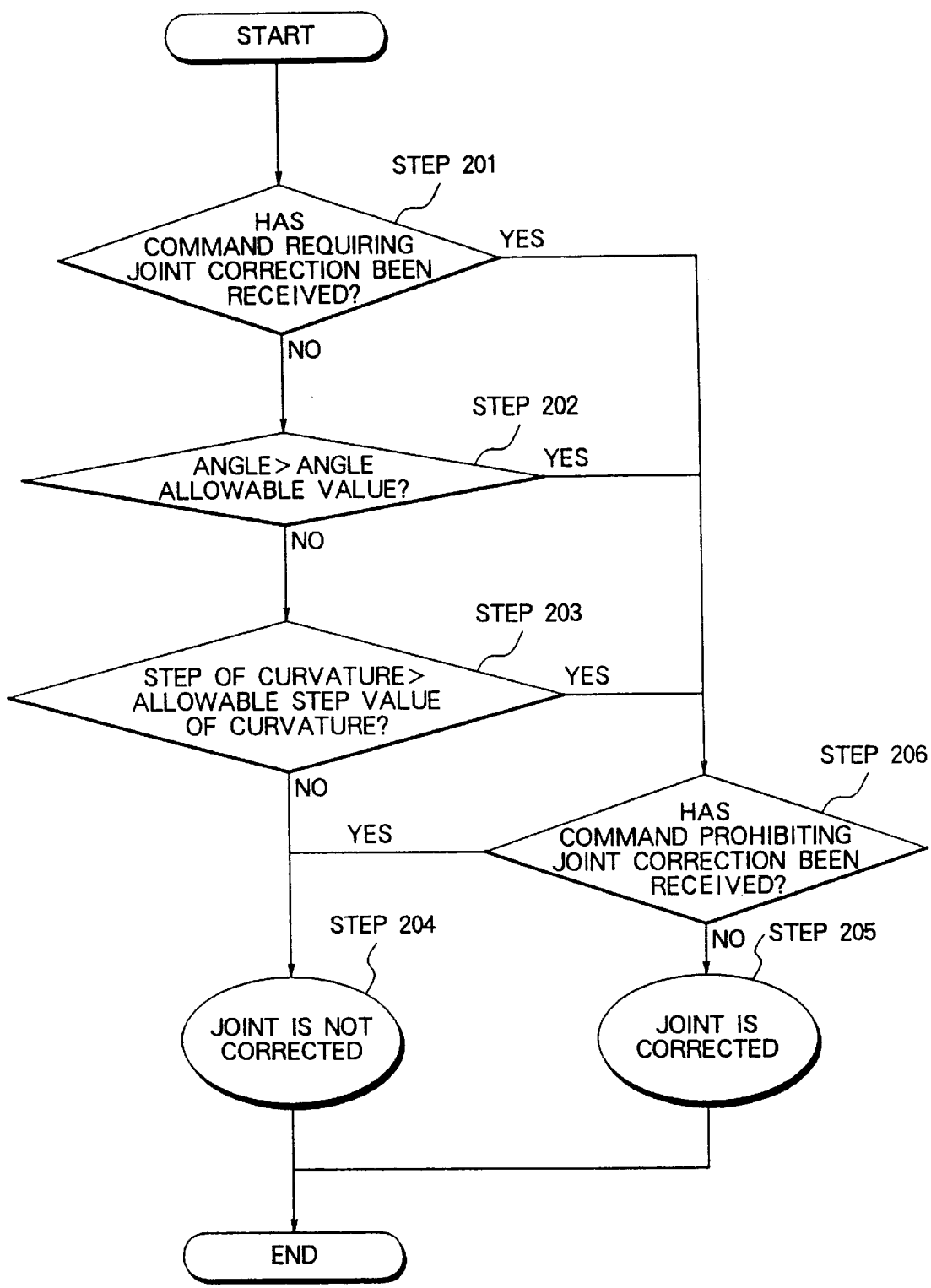
FIG. 15 is a flowchart illustrating operations of a method of a fifth embodiment of the invention.

In FIG. 15, the sequence of steps 205 and 206 is clearly arbitrary.

The previously registered commands include instructions requiring to pass by, or stop at, a specified position such as a command to accurately measure a coordinate value and a command requiring to stop accurately at that position and perform an operation (replacement of a tool, drilling, etc.).

According to the present invention, it is possible to cause accurate passage on, stoppage at, specified position in compliance with an instruction requiring passage and stoppage at the specified position, thus making it possible to prevent malfunction or erroneous detection.

(Sixth Embodiment)

Figure 16:
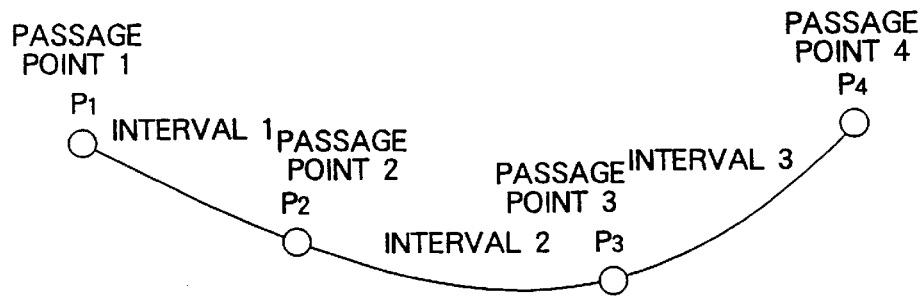
FIG. 16 illustrates an example of the piecewise curve comprising three intervals.

In the above-mentioned first to third embodiments, a spline curve comprising a single interval has been inserted. In this sixth embodiment, in contrast, a piecewise spline curve comprising a plurality of intervals is inserted. FIG. 16 illustrates a typical piecewise curve comprising three intervals.

The configuration of the sixth embodiment, being the same as that shown in the block diagram of FIG. 1, is not described here. Operations of the joint correcting section 701 is the same as those shown in the flowchart of FIG. 3. A description thereof is therefore omitted here.

In the first embodiment, a spline curve comprising a single interval has been used in step 92. In the sixth embodiment, a spline curve comprising a plurality of intervals is used. The following description will cover a case with four intervals.

The restricting conditions to be satisfied by the curve are as follows. First, the position, the angle and the curvature must be continuous at five positions P1 to P5 (in order that the position, the angle and the curvature are continuous, it suffices that the position, the speed and the acceleration are continuous). When the number of intervals is n, the only condition for being continuous is 3×(n+1). Further, with a view to satisfying the restriction imposed on the locus accuracy, a position for passage is specified simply at a position where the path to be inserted is the most distant from the original path (at the center portion in most cases). In total of the above, the number of intervals of four results in the only restricting condition (3×(4+1)+1=16). Any kind of path is applicable so far as it satisfies the foregoing restricting conditions. In general, the paths as a whole have a degree of freedom of (n)×(number of degree of curve+1). Since n is 4 in this case, the number of degrees of the curve would be 3, i.e., a three-degree spline curve will do for this purpose. When assuming a formula of the curve for each interval $Qj(t)$ (t=0 to Lj, j is the number of interval), it can be expressed as:

$$Qj(t) = Cj3 t^3 + Cj2 t^2 + Cj1 t + Cj0 \qquad (4)$$

where t is a parameter; Li is the length of the path for the interval l; and Cji (j=1 to 4 and i=0 to 3) is a coefficient of the curve for each interval j. By applying the foregoing restricting conditions to formula (4), the following formulae are available:

$$Q1(0) = Pb \qquad (4\text{-}1)$$

$$Q1'(0) = Vb \qquad (4\text{-}2)$$

$$Q1''(0) = Ab \qquad (4\text{-}3)$$

$$Q2(0) = Q1(L) \qquad (4\text{-}4)$$

$$Q2'(0) = Q1'(L) \qquad (4\text{-}5)$$

$$Q2''(0) = Q1''(L) \qquad (4\text{-}6)$$

$$Q3(0) = Q2(L) \qquad (4\text{-}7)$$

$$Q3'(0) = Q2'(L) \qquad (4\text{-}8)$$

$$Q3''(0) = Q2''(L) \qquad (4\text{-}9)$$

$$Q4(0) = Q3(L) \qquad (4\text{-}10)$$

$$Q4'(0) = Q3'(L) \qquad (4\text{-}11)$$

$$Q4''(0) = Q3''(L) \qquad (4\text{-}12)$$

$$Q4(L) = Pf \qquad (4\text{-}13)$$

$$Q4'(L) = Vf \qquad (4\text{-}14)$$

$$Q4''(L) = Af \qquad (4\text{-}15)$$

$$Q3(0) = Pc \qquad (4\text{-}16)$$

where, symbol "'" means differentiation with t; Pb, Vb and Ab are the position, the speed and the acceleration, respectively, of the immediately following path; Pf, Vf and Af are the position, the velocity and the acceleration, respectively, of the immediately preceding path; and Pc is the passage position at the center portion; these being calculable in accordance with the formulae (3-1) to (3-7) as in the first embodiment.

Figure 17:
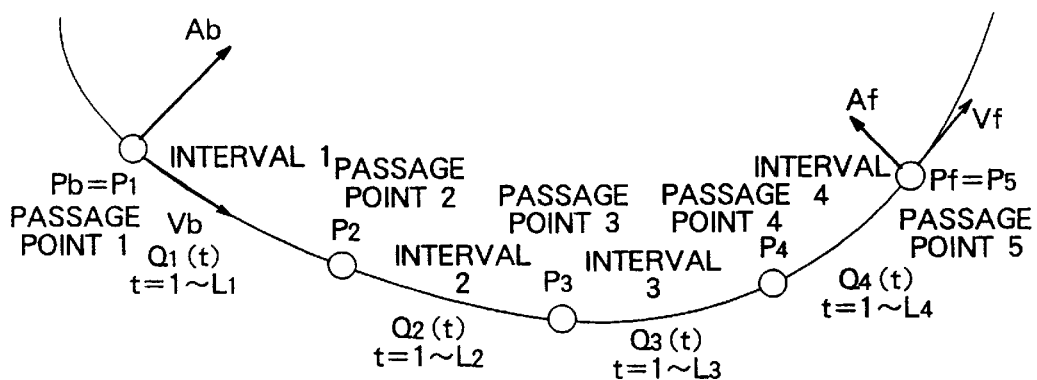
FIG. 17 illustrates a path corrected by a method of a sixth embodiment of the invention.

The curve coefficients Cji are primarily determined by solving the foregoing formulae (4-1) to (4-16). A path determined in this manner is illustrated in FIG. 17.

As is known from the aforesaid example, a piecewise path as a whole has a degree of freedom proportional to the number of intervals. Even for a curve having a low number of degrees, therefore, the angle and the curvature can be made continuous. For example, any spline having a degree of at least three is applicable for a case with three intervals. Because a curve of a low degree requires only a small amount of calculations, this is suitable particularly for a real-time processing such as numerical control (NC). It suffices to provide a three-degree spline curve for a number of intervals of at least four, and a degree of freedom is excessive. Use of this excessive degree of freedom permits various arrangements.

(Seventh Embodiment)

In the methods described in the above-mentioned first to third and sixth embodiments of the invention, the coefficients of the curve are determined by solving the simultaneous linear equations. In general, solution of simultaneous linear equations requires a large amount of calculations, and is not therefore suitable for real-time processing. In the seventh embodiment, the amount of calculations is reduced by the following method.

A case using a four-degree Bezier curve will be described below as an example. In general, it suffices to select a degree of at least three, or other curve such as a B-spline curve or an NURBS curve is also applicable.

The configuration of the seventh embodiment, being the same as that shown in the block diagram of FIG. 1, is not described here. Operations of the joint correcting section 701 are the same as those shown in the flowchart of FIG. 3 except for step 92. A description thereof is therefore omitted here.

Figure 18:
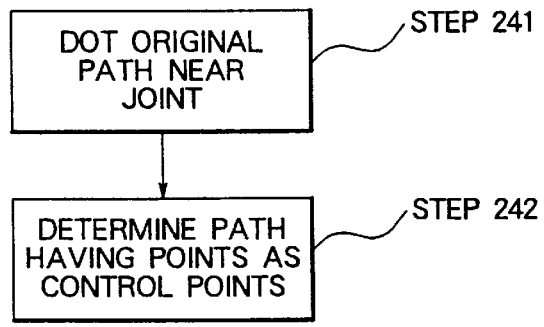
FIG. 18 is a flowchart illustrating operations of a method of a seventh embodiment of the invention.

In the seventh embodiment, the procedure illustrated in FIG. 18 is followed in place of step 92. In step 241, a plurality of points near the original path joint are selected. For example, several points at, before and after the joint portion are selected, respectively. The interval between points is arbitrary. The number of selected points must be larger than the number of degrees of the curve by equal to or more than one. In the present case, the curve has a number of degrees (m) of four; the number of selected points is five; and the selected points are assigned reference numerals P0, P1, . . . P4.

Then, in step 242, a curve Q(t) (t=0 to1) having the points selected in step 241 as control points is determined. More specifically, it is expressed by:

$$Q(t) = \sum_{i=0}^{m} Bi(t)Pi \qquad (5\text{-}1)$$

$$Bi(t)=(m!/(m-i)!i!)\times(t^i)\times(1-t)^{(m-i)} \qquad (5\text{-}2)$$

where Bi(t) is a base function. By using this base function, continuity of the position, the angle and the curvature of the curve is ensured. There is available a base function also for a B-spline curve or an NURBS curve. By using the base function thus available, continuity of the position, the angle and the curvature of the curve is ensured.

Figure 19:
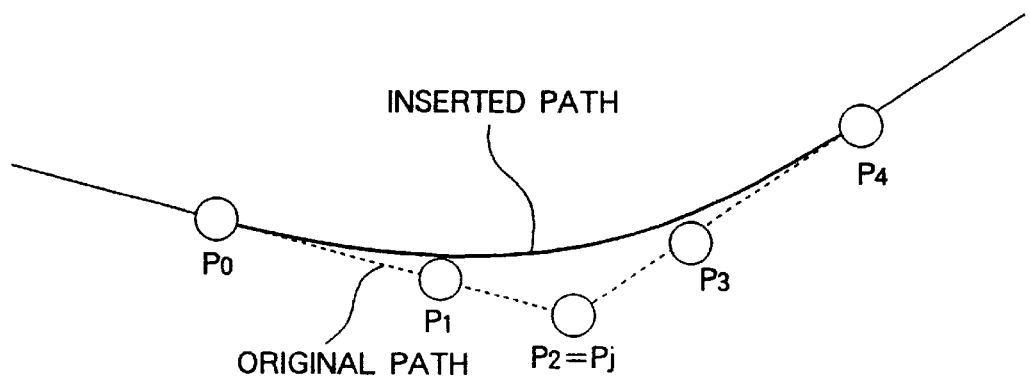
FIG. 19 illustrates a path corrected by a method of the seventh embodiment of the invention.

FIG. 19 illustrates the result of joint correction according to the invention. In FIG. 19, the dotted line represents the original path; Pj is the joint of the original path; the marks ○ represent a plurality of points near the joint of the original path; and the solid line represents the inserted curve.

This method is to determine a curve by multiplying the points on the original locus by the value of the base function in place of solving the simultaneous linear equations. This requires only a small amount of calculations, and is therefore suitable for real-time processing. Arrangement of the curve can be freely changed by changing the arrangement of the points on the original locus, the number of degrees of the curve, or the kind of curve.

The above description has covered a case involving the joint between straight lines. In general, it is similarly applicable to an arbitrary joint.

It is not always necessary that points selected on the original path are at equal intervals, but points arranged at equal intervals provides an advantage of simpler calculations.

(Eighth Embodiment)

In an eighth embodiment of the invention, the curvature is further reduced by causing the path to be inserted to pass inside the original path near the joint, and to pass outside the original path on the periphery of the joint.

The following description will cover a case where a curve comprising a single interval as that described in the first embodiment is inserted. The present invention is, however, also applicable to a curve comprising a plurality of intervals. The kind and the number of degrees of the curve can be changed.

The configuration of the eighth embodiment, being the same as that shown in the block diagram of FIG. 1, is not described here. Operations of the joint correcting section 701 are the same as those shown in the flowchart of FIG. 3 except for step 92. A description thereof is therefore omitted here.

Figure 20:
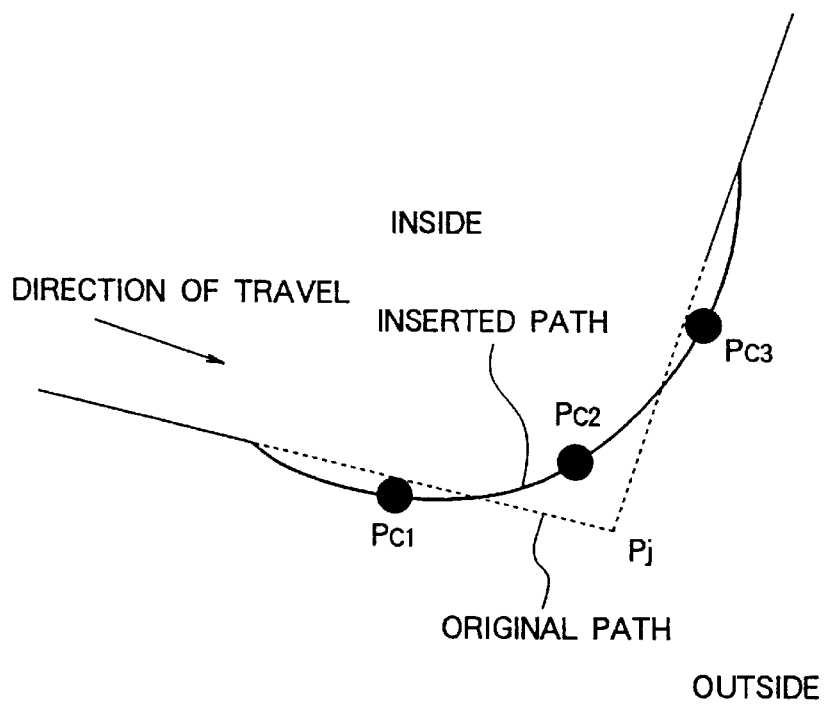
FIG. 20 illustrates a path corrected by a method of an eighth embodiment of the invention.

In the eighth embodiment, the following procedure is complied with in place of step 92. The following restricting conditions are added to the above-mentioned equations (2-1) to (2-6) described in the first embodiment:

$$P(L/4)=Pc1 \qquad (6\text{-}1)$$

$$P(L/2)=Pc2 \qquad (6\text{-}2)$$

$$P(3\times L/4)=Pc3 \qquad (6\text{-}3)$$

where, Pc1, Pc2 and Pc3 are points of passage at positions distant by L14, L/2 and 3×L/4, respectively, from the starting point of the path. Arrangement of Pc1, Pc2 and Pc3 is illustrated in FIG. 20. When turning a corner (joint), the turning direction is assumed to be inside, and the opposite side, to be outside. Then, Pc2 is arranged inside, whereas both Pc1 and Pc3 are arranged outside. There are imposed nine restricting conditions, and the number of degrees of the curve is eight. More specifically, the curve P(t) (t=0–L) can be expressed by:

$$P(t)=C8t^8+C7t^7+C6t^6+C5t^5+C4t^4+C3t^3+C2t^2+C1t+C0 \qquad (7)$$

The coefficients Ci of the curve are primarily determined by solving the simultaneous linear equations obtained by applying the restricting conditions (2-1) to (2-6) and (6-1) to (6-3) to the formula (7).

Figure 21:
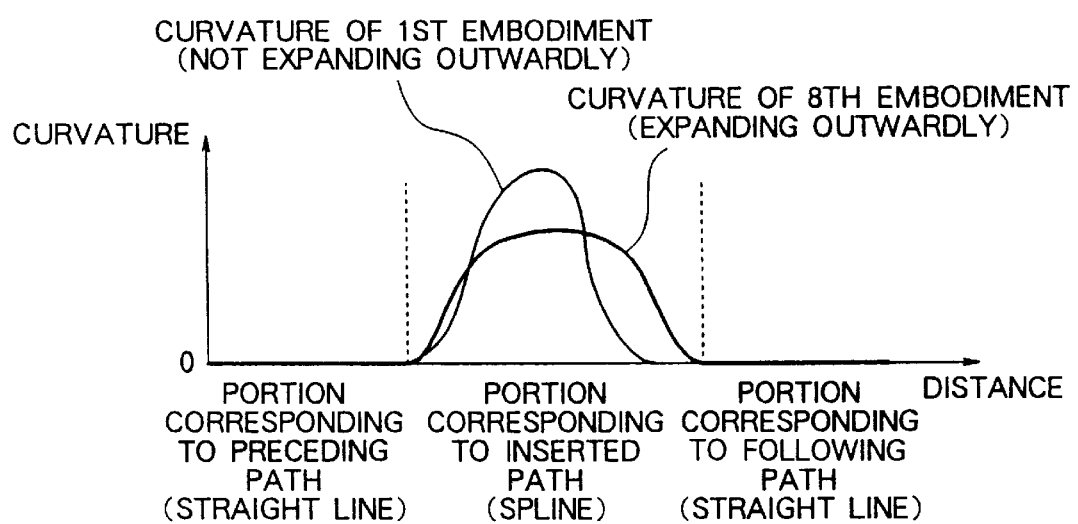
FIG. 21 illustrates the angle and the curvature of a path corrected by the method of the eighth embodiment of the invention.

FIG. 21 illustrates the angle and the curvature of the path after correction according to the method of the eighth embodiment as compared with a case in which the method of the first embodiment is applied. As is clear from FIG. 21, the maximum value of curvature is lower than that in the first embodiment. Expanding once outside, then entering inside, and then expanding outside again causes a larger turning locus of the path, and as a result, the curvature becomes smaller. This is similar to a movement called "out-in-out" in car driving. In the method of the eighth embodiment, as described above, it is possible to reduce the curvature, and hence to achieve a higher-velocity displacement or travel while maintaining high locus accuracy.

(Ninth Embodiment)

In the aforementioned first embodiment of the invention, the range of correction of the path to be corrected may be the range of correction described in the NC program, or when this description is omitted, may be a previously registered value. In the ninth embodiment, in contrast, a method of changing the range of correction of the path to be corrected in response to the magnitude of the velocity will be described below.

The configuration of the ninth embodiment, being the same as that shown in the block diagram of FIG. 1, is not described here. Operations of the joint correcting section 701 are the same as those shown in the flowchart of FIG. 3 except for step 91. A description thereof is therefore omitted here.

Figure 22:
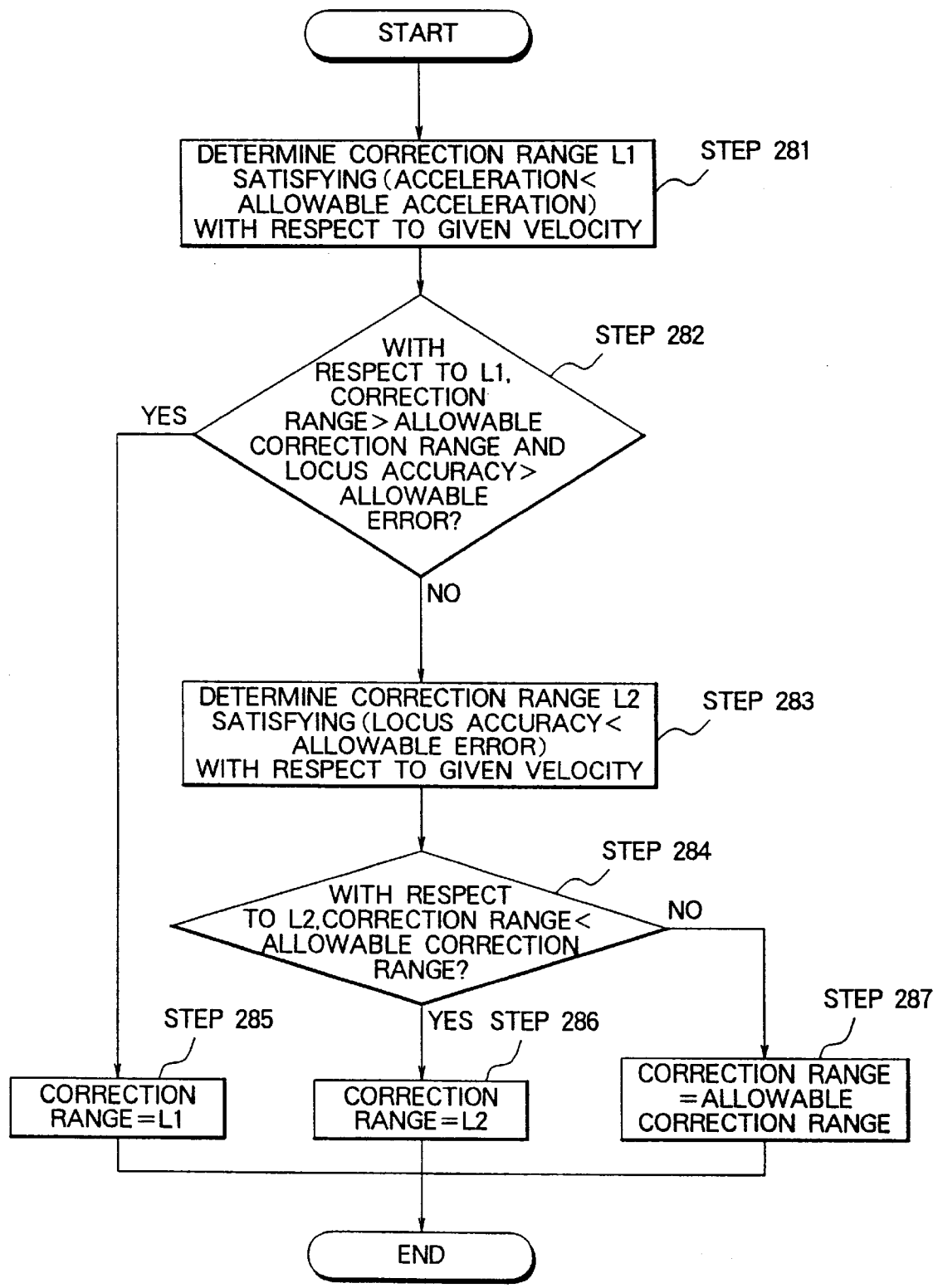
FIG. 22 is a flowchart illustrating operations of a method of a ninth embodiment of the invention.

In the ninth embodiment, the procedure shown in FIG. 22 is performed in place of step 91. First, in step 281, a range of correction L1 satisfying a specific condition (an acceleration<an allowable acceleration) relative to a given velocity is determined. Then, in step 282, it is determined whether or not another condition (a correction range>an allowable range, and a locus accuracy<an allowable error) for the range of correction L1 determined in step 281 is satisfied. If satisfied, the process proceeds to step 285 in which a correction range is established as L1. If not, the process goes to step 283. In step 283, a correction range L2 satisfying a condition (a locus accuracy<an allowable error) for the given velocity, and the process goes to step 284. In step 284, it is determined whether or not a condition (a correction range<an allowable correction range) for the correction range L2 calculated in step 283. If satisfied, the process proceeds to step 286 in which the correction range is established as L2. If not, the process goes to step 287 in which a correction range is established to the allowable correction range.

The allowable range of correction used in FIG. 22 is a value specified in the NC program, or a previously registered value in default. It is of course necessary for the allowable range of correction to be up to the length of the original path (when correcting the original path at the both ends thereof, up to a half of the original path).

The correction range of the path has been changed as the most easily adjustable parameter in the foregoing method. It is also effective to change the kind or the number of degrees of the curve to be inserted, or the specified point of passage.

According to the method of the ninth embodiment, it is possible to correct the path so as to satisfy the allowable acceleration, the allowable error and the allowable range of correction and keep the minimum necessary error in locus for limiting the acceleration to less than the allowable acceleration, resulting in a satisfactory locus accuracy.

(Tenth Embodiment)

In a tenth embodiment of the invention, a method of changing the path to be corrected in response to the magnitude of vibration will be described.

The configuration of the tenth embodiment, being the same as that shown in the block diagram of FIG. 1, is not described here. Operations of the joint correcting section 701 are the same as those shown in the flowchart of FIG. 3 except for step 91. A description thereof is therefore omitted here.

Figure 23:
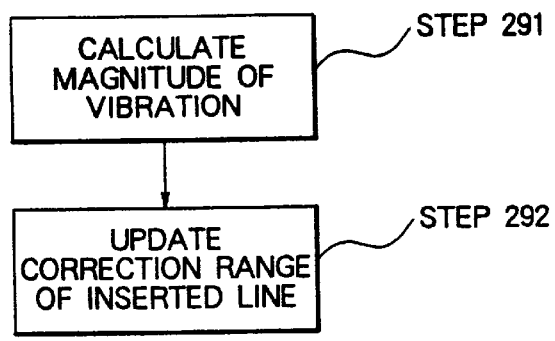
FIG. 23 is a flowchart illustrating operations of a method of a tenth embodiment of the invention.

In the ninth embodiment, the procedure shown in FIG. 23 is followed in place of step 91. First, in step 291, the magnitude of vibration is calculated. The magnitude of vibration may be determined from the size of a vibration, component involved in the path, or from the size of a vibration component contained in motor current. Or, the value from a sensor attached to the machine may be used. In step 292, the range of correction is corrected so that the magnitude of vibration determined in step 291 becomes not greater than a predetermined reference value V0. For example, when the current or present range of correction is L1 and vibration has a magnitude of V1, the correction range should be modified into L1×V0/V1.

Figure 24:
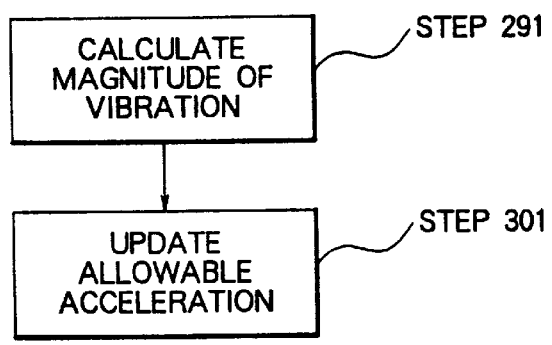
FIG. 24 is a flowchart illustrating operations of a second method of the tenth embodiment of the invention.
Figure 25:
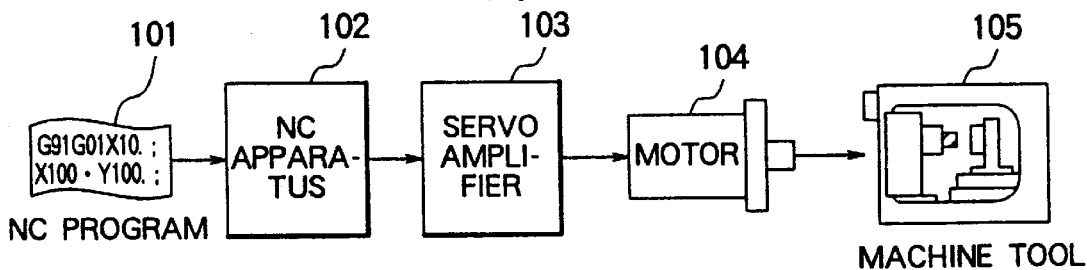
FIG. 25 is a block diagram illustrating a configuration of a general NC machine tool.
Figures 26, 27:
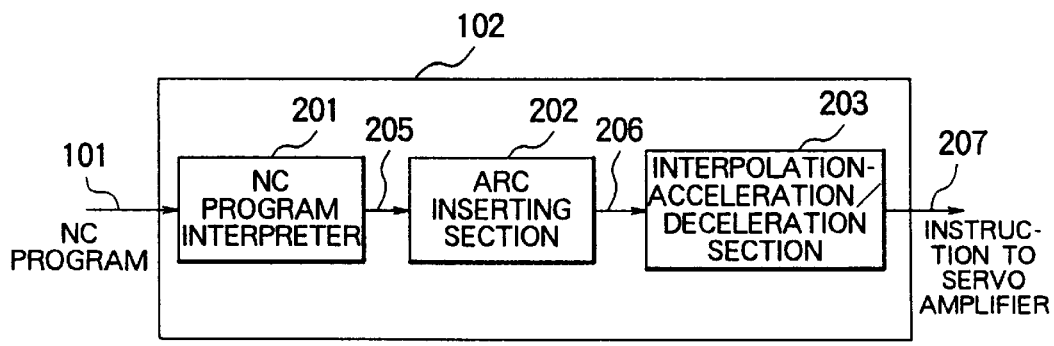
FIG. 26 is a block diagram illustrating a conventional path correction method.
FIG. 27 illustrates an NC program in the conventional path correcting method.
Figure 28:
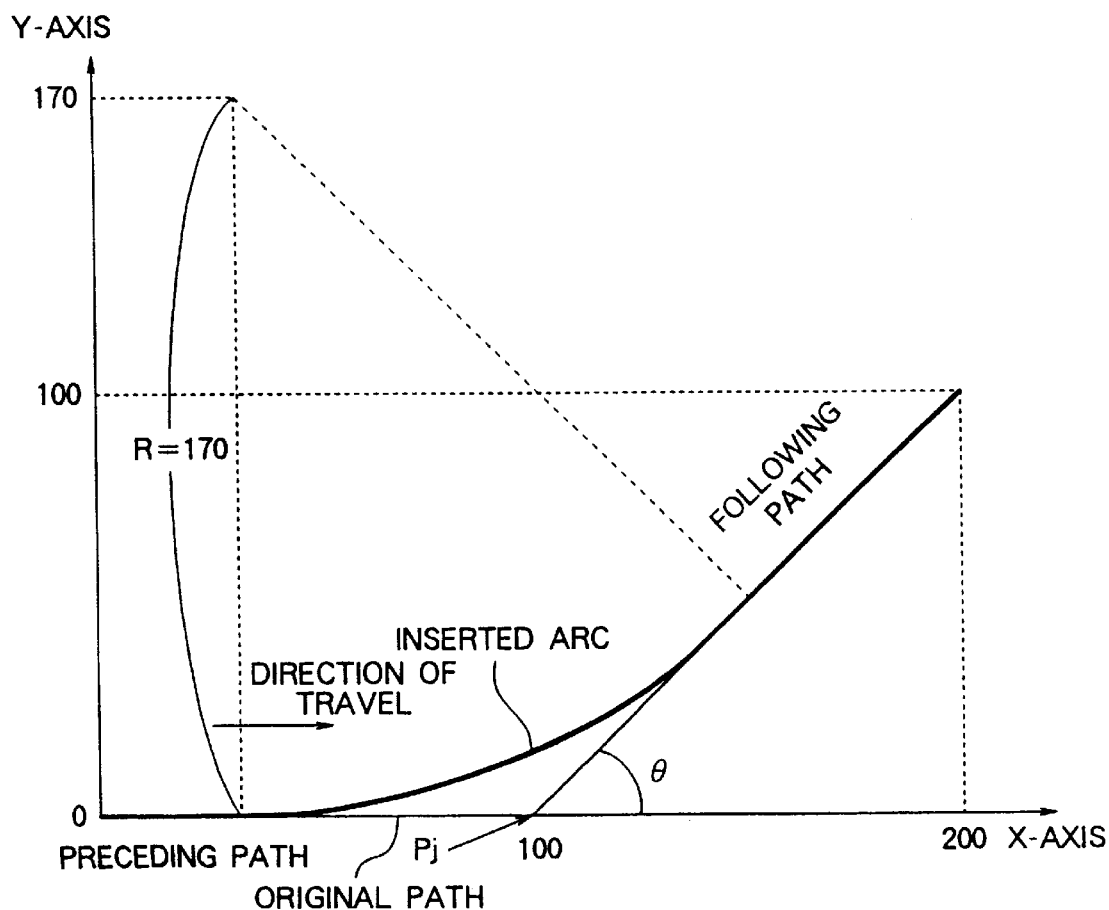
FIG. 28 illustrates the result of path correction according to the conventional path correction method.
Figure 29:
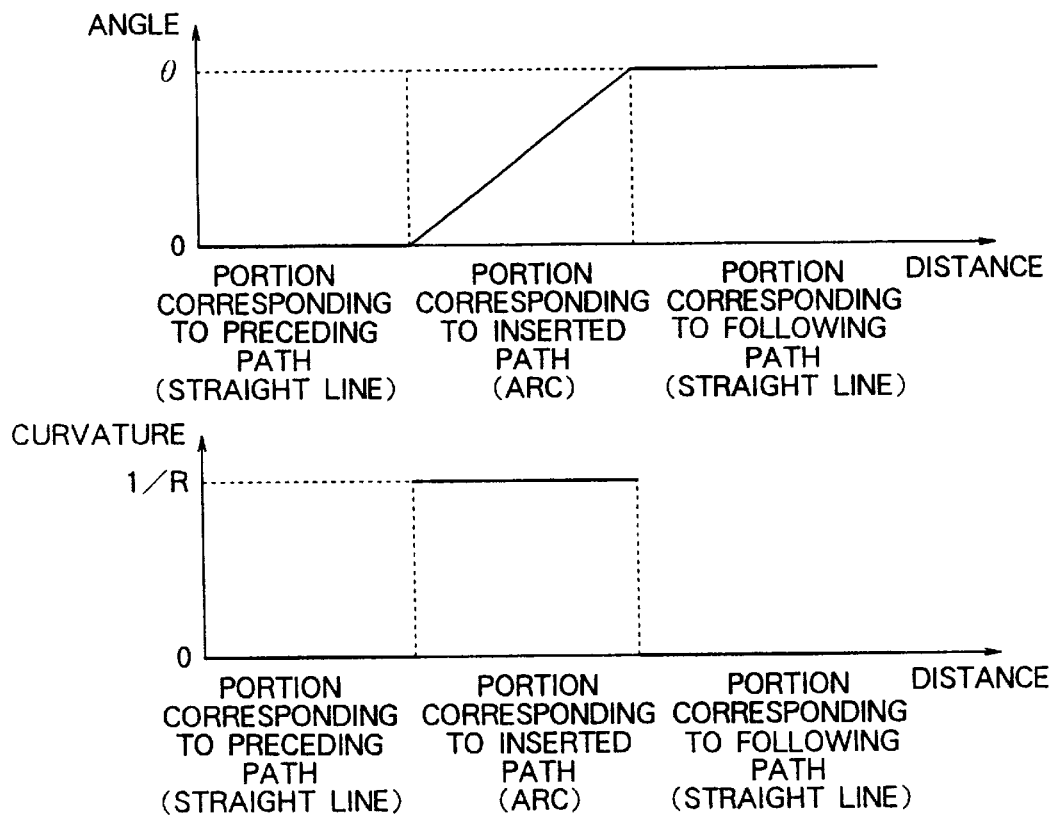
FIG. 29 is a graph illustrating the angle and the curvature of a path after correction by the conventional path correcting method.
Figure 30:
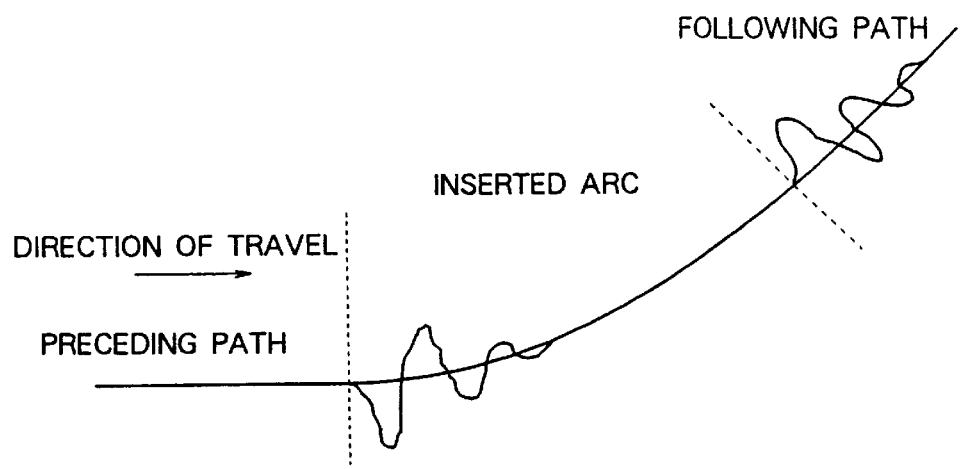
FIG. 30 illustrates occurrence of a mechanical vibration.

Or, when a correction range is automatically calculated from the value of allowable acceleration as in the ninth embodiment, it is effective to change the allowable acceleration in accordance with the procedure shown in FIG. 24.

In FIG. 24, step 291 is the same as that of FIG. 23, and hence is not described here. In step 301, the allowable acceleration is corrected so that the magnitude V of vibration determined in step 291 becomes no greater than the predetermined reference value V0. When currently the allowable acceleration is A1, and the magnitude of vibration is V1, for example, the correction range should be A1×V0/V1.

In the method of the tenth embodiment, it is possible to inhibit occurrence of vibration with a minimum necessary amount of correction by increasing the amount of correction of the path upon occurrence of vibration, and reducing the amount of correction of the path when there is no vibration, thus resulting in a satisfactory locus accuracy.

Although the range of correction of the path has been changed as the most easily adjustable parameter in this method, it is also effective to change the kind, the number of degrees of the curve to be inserted or the point of passage to be specified.

According to the present invention, not only the angle but also the curvature can be made smoothly continuous. When the curvature is thus continuous, it is possible to cause travel without causing a mechanical vibration, and to obtain a satisfactory locus accuracy without reducing the velocity.

A portion to be corrected is automatically selected even when a command requiring joint correction is not explicitly instructed in the NC program. This provides an advantage of saving labor for modifying the NC program.

Upon receipt of an instruction requiring passage or stoppage at a specific position, it is possible to accomplish passage or stoppage accurately at the specified position. It is thus possible to prevent a malfunction or erroneous detection.

By using a curve comprising a plurality of intervals, a curve of low degrees requires only a small amount of calculations. The method of the invention is therefore suitable for real-time processing such as numerical control. A three-degree spline curve suffices so far as it has four or more intervals, with one or more degrees of freedom remaining in excess. Thus, various arrangements are possible by utilizing this degree of freedom in excess.

A curve can be determined by multiplying points on the original locus by the value of a base function. This results in a smaller amount of calculations, so that the method of the invention is suitable for real-time processing. Arrangement of the curve can be freely changed by changing the arrangement of points on the original locus, the number of degrees or the kind of the curve. Further, when the points on the original path are at equal intervals, an advantage of simpler calculations is provided.

The curvature can be reduced by causing the path to once expand to outside, then entering inside, and then expand to outside again, thus making it possible to cause a higher-velocity displacement or travel while keeping a satisfactory locus accuracy.

It is possible to correct the path so as to maintain the minimum necessary locus error to satisfy the allowable acceleration, the allowable error, and the allowable range of correction, and to limit acceleration to less than the allowable acceleration, resulting in a satisfactory locus accuracy.

It is also possible to inhibit or suppress production of vibration with the minimum necessary amount of correction by increasing the amount of path correction upon occurrence of vibration, and reducing the amount of path correction when vibration does not occur, resulting in a satisfactory locus accuracy.

What is claimed is:

1. A numerical control apparatus for determining a travel path of an object, the apparatus comprising:

a numerical control program interpreter for reading instructions in a numerical control program and outputting first and second adjacent travel paths, wherein a joint creating a discontinuity in at least one of curvature and acceleration exists between the first and second travel paths;

a joint correcting section coupled to said numerical control program interpreter for receiving a correction range indicative of a portion of the first and second travel paths to be corrected and an allowable error value indicative of a permissible deviation from the first and second travel paths, and for outputting a third travel path replacing the joint, based on the first and second travel paths, the correction range, and the allowable error value, wherein the third travel path has continuous curvature and acceleration; and an interpolation-acceleration/deceleration section coupled to said joint correction section and receiving the third travel path, for outputting instructions to a servo amplifier for controlling the travel path of an object based on the third travel path.

2. The numerical control apparatus of claim 1 wherein the third travel path includes a curve defined by a polynomial equation, wherein said joint correction section calculates coefficients for the polynomial expression by solving simultaneous equations for position, velocity, and acceleration of the object along the third travel path.

3. The numerical control apparatus of claim 1 wherein the first travel path comprises a line segment extending in a first direction and the second travel path comprises a line segment extending in a second direction angularly offset from the first direction.

4. The numerical control apparatus for claim 1, wherein the first travel path comprises a line segment having an end point and the second travel path comprises an arc joining the line segment at the end point.

5. The numerical control apparatus of claim 1, wherein the first travel path comprises a first arc having a first curvature and the second travel path comprises a second arc having a second curvature different from the first curvature.

6. The numerical control apparatus of claim 1, wherein said joint correction section measures a change in curvature between the first and second travel paths and determines the third travel path only when the change in curvature exceeds a first value.

7. The numerical control apparatus of claim 1, wherein said joint correction section measures an angle between the first and second travel paths and determines the third travel path only when the angle exceeds a first value.

8. The numerical control apparatus of claim 1, wherein said joint correction section measures an angle and a change in curvature between the first and second travel paths and determines the third travel path if either the angle exceeds a first value or the change in curvature exceeds a second value.

9. The numerical control apparatus according to claim 1, wherein the third travel path has a locus accuracy within the allowable error value.

10. The numerical control apparatus according to claim 1, wherein said joint correcting section determines a point within the first and second travel paths where one of an angle, the curvature, and the acceleration associated with the first and second travel paths is discontinuous.

11. The numerical control apparatus according to claim 1, wherein, when a specific command previously registered is specified for a joint between two paths, said joint correction section does not correct the joint.

12. The numerical control apparatus according to claim 1, wherein the third travel path output by said joint correction section includes a piecewise path comprising a plurality of intervals.

13. The numerical control apparatus according to claim 12, wherein the piecewise path output by said joint correcting section includes a curve having a plurality of control points on the first and second travel paths.

14. The numerical control apparatus according to claim 1, wherein the third travel path output by said joint correcting section runs inside the first and second travel paths near the joint and runs outside the first and second travel paths near a periphery of the joint.

15. The numerical control apparatus according to claim 1, wherein said joint correction section calculates the third travel path in response to calculated speed of an object near the joint.

16. The numerical control apparatus according to claim 1, wherein said joint correction section calculates the third travel path in response to vibration produced at the joint.

17. A numerical control method comprising: receiving, at a numerical control program interpreter, instructions in a numerical control program for controlling a travel path of an object, and outputting first and second adjacent travel paths for the object based on the instructions, wherein a joint comprising a discontinuity in curvature exists between the first and second travel paths;

receiving, at a joint correcting section, the first and second travel paths and outputting a third travel path based on the first and second travel paths, a correction range indicative of a portion of the first and second travel paths to be corrected, and an allowable error value indicative of a permissible deviation from the first and second travel paths, the third travel path being continuous in curvature and acceleration with the first and second travel paths; and receiving, at an interpolation-acceleration/deceleration section coupled to said joint correction section, the third travel path and outputting instructions to a servo amplifier for controlling the travel path of the object based on the third travel path.

18. The numerical control method according to claim 17, wherein the third travel path has a locus accuracy within the allowable error value.

19. The numerical control method according to claim 17, wherein said joint correcting section determines a point within the first and second travel paths where one of an angle, the curvature, and the acceleration associated with the first and second travel paths is discontinuous as being a joint.

20. The numerical control method according to claim 17, wherein, when a specific command previously registered is specified for a joint between two paths, said joint correcting section does not correct the joint.

21. The numerical control method according to claim 17, wherein the third travel path output by said joint correcting section includes a piecewise path comprising a plurality of intervals.

22. The numerical control method according to claim 21, wherein the piecewise path output by said joint correcting section includes a curve having a plurality of control points on the first and second paths.

23. The numerical control method according to claim 17, wherein the third travel path output by said joint correcting section runs inside the first and second travel paths near the joint and runs outside of first and second travel paths near a periphery of the joint.

24. The numerical control method according to claim 17, wherein the joint correction section calculates the third travel path in response to calculated speed of an object near the joint.

25. The numerical control method according to claim 17, wherein the joint correction section calculates the third travel path in response to vibration produced at said joint.

* * * * *